United States Patent [19]

Trocola

[11] Patent Number: 5,113,572
[45] Date of Patent: May 19, 1992

[54] MACHINE AND METHOD FOR AUTOMATICALLY ASSEMBLING BUTTONS

[75] Inventor: Gary M. Trocola, Prospect, Conn.

[73] Assignee: The Ball and Socket Manufacturing Company of Delaware, Inc., Cheshire, Conn.

[21] Appl. No.: 599,671

[22] Filed: Oct. 17, 1990

[51] Int. Cl.$^5$ .......................... B23P 19/00; B23Q 7/10
[52] U.S. Cl. ........................................ 29/509; 29/516; 29/788; 29/796; 29/818
[58] Field of Search ...................... 29/243.5, 712, 771, 29/787, 788, 795, 796, 818, 509, 510, 511, 516

[56] References Cited

U.S. PATENT DOCUMENTS

| | | | |
|---|---|---|---|
| 4,019,666 | 4/1977 | Foults | 29/771 X |
| 4,309,787 | 1/1982 | Lapohn | 29/787 X |
| 4,346,515 | 8/1982 | Lodding et al. | 29/787 X |

Primary Examiner—Timothy V. Eley
Attorney, Agent, or Firm—Hayes & Reinsmith

[57] ABSTRACT

A machine for assembling a button shell and button back which features a pair of feeders for advancing shells and backs to a locating and closing station and a mandrel movable from a locating jig to an overlying locating head for registering a shell within a die therein, and power means for driving the die and shell into a closing die of the jig for crimping the shell about a button back to form a finished button. A method of assembling buttons is disclosed including steps of nesting a button shell and button back, engaging the shell of a nested shell and back within a shell locating die in precise registration therein, and then closing the shell onto the back by compressing the nested shell and back between the shell locating die and a closing die.

35 Claims, 9 Drawing Sheets

MACHINE AND METHOD FOR AUTOMATICALLY ASSEMBLING BUTTONS

FIELD OF THE INVENTION

This invention generally relates to a machine and method for assembling metal buttons and specifically concerns a machine and method for automatically assembling preformed, stamped shells with complementary button backs.

BACKGROUND OF THE INVENTION

Metal buttons for military uniforms, uniforms for policemen and firemen, and related fashion apparel have been assembled by hand for years. Such buttons vary in size from about 10 or 12 lignes to about 45 lignes in diameter. A ligne is a unit of measure in the art which is equal to 0.025 inch. Such buttons comprise a "shell" and a "back" as separate, discrete pieces. During a conventional time-consuming manual assembly process, the shell may be burnished about its outer rim and frequently on highlighted portions of imagery formed on a face of the shell. The button back is then received within the confines of a sidewall of a burnished shell to be crimped or closed onto the sidewall of the button back to form a completed button.

OBJECTS OF THE INVENTION

A principal object of this invention is to provide a new and improved machine for automatically assembling a button shell and button back which features a significantly simplied construction of compact, economical design constructed to provide accurate and reliable operation over an extended period of time with minimum service requirements.

Another object of this invention is the aim of providing such a new and improved machine particularly suited to be readily adjustable for minimizing need for close tolerances and yet providing precision accommodation of button parts of varying size.

Yet another object of this invention is to provide such a machine featuring a new and improved work station which ensures optimum location and alignment of the button parts and which automatically effects a closing operation to form a finished button of desired joint strength in its assembled shell and back.

Still another object of this invention is to provide such a machine for accomplishing burnishing, locating and closing operations automatically in a machine which is easy to manufacture and assemble for use in a low cost, high speed button assembly operation.

A further object of this invention is to provide a new and improved method of assembling buttons which features a series of simplified high speed steps to effect closure of a button shell onto a button back.

Yet another object of this invention is to provide a new and improved method of assembling buttons in a series of efficient, automatic steps including burnishing of a button shell and assembling that burnished shell with a back in a locating and closing process which is particularly efficient in the optimal positioning of the components preliminary to closing the components in a finished button assembly.

Other objects will be in part obvious and in part pointed out more in detail hereinafter.

A better understanding of this invention will be obtained from the following detailed description and the accompanying drawings of an illustrative application of this invention.

SUMMARY OF THE INVENTION

This invention has overcome the above-noted disadvantages of the known prior art by automatically feeding button shells and button backs along separate feed paths to a work station wherein the shell and back parts of a button are nested and precisely located in engagement with a shell locating die before the shell sidewall is crimped about a back sidewall in a powered closing operation. The machine and method are particuarly suited for quick and easy operation with minimized down time and service requirements even under demanding conditions while optimizing the operating cycle.

DETAILED DESCRIPTION OF A PREFERRED EMBODIMENT

Figure 1:
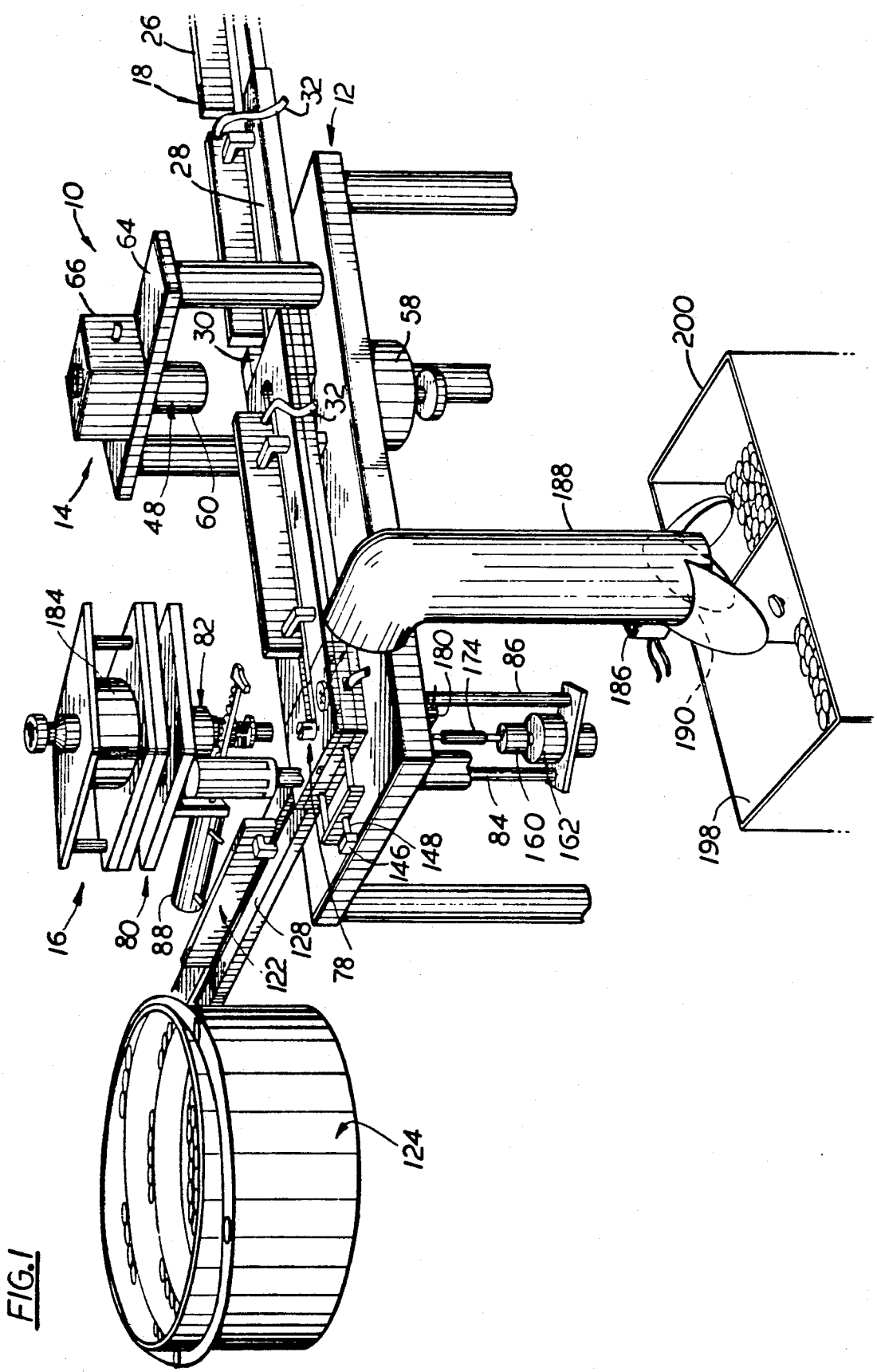
FIG. 1 is a perspective view, partly broken away, illustrating a machine incorporating this invention.

Referring to the drawings in detail, machine 10 includes a frame 12 supporting a burnishing station 14 and a downstream work station 16 particularly suited for automatically assembling metal buttons. It will be understood that a vibratory hopper feeder, not shown, is provided upstream of the burnishing station 14 for automatically delivering button shells to the burnishing station 14 along a track 18.

The shells 20 (FIG. 2) are normally preformed of nickel silver alloy, brass, steel or any other suitable metal. The shells each have a circular face and depending sidewall 22 with imagery 24, shown for illustrative purposes as a four point star, stamped onto the outside of face 24 of shell 20. Shells are fed face up along track 18 which is illustrated as having a vertically oriented top rail 26 in overlying relation to a pair of split rails 28, 30 which are readily adjustable for different ligne sizes, typically ranging from 18 to 45 lignes.

Figure 6:
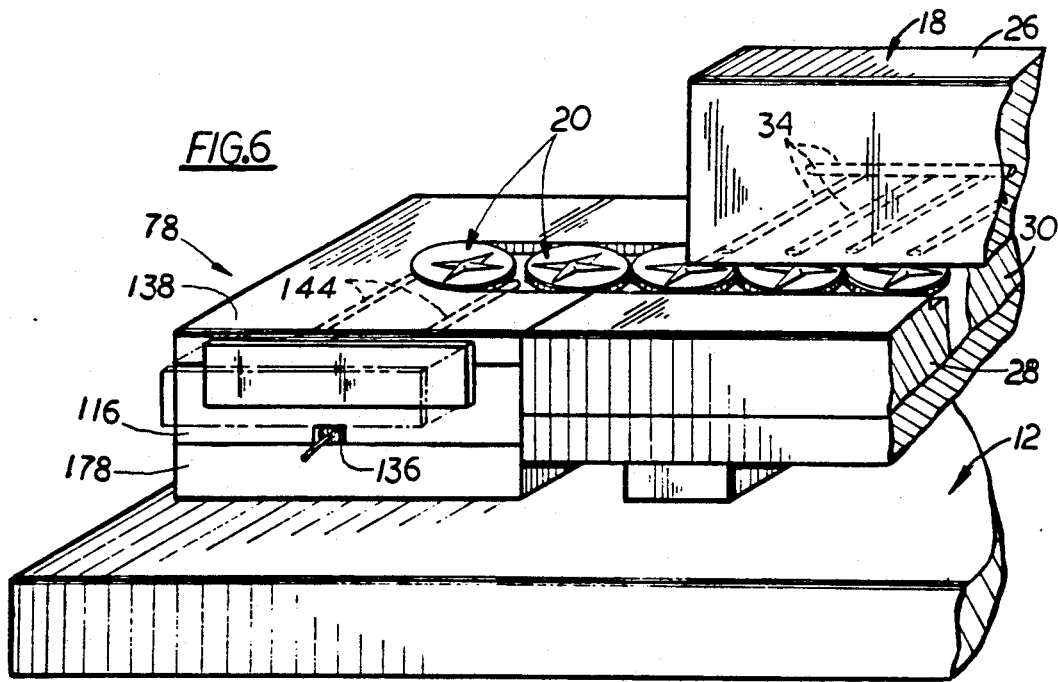
FIG. 6 is an isometric view, partly broken away and partly in section, showing certain components including those parts of FIG. 5 shown in assembled relation.

Air from a compressed air supply source, not shown, serves to move the shells 20 along the track. Air supply lines are shown at in part at 32 in FIG. 1 and will be understood to be connected to that source of compressed air. Passages may be formed in the top rail 26 and connected to the lines 32. For example, an end of the shell track 18 extending between the burnishing station 14 and the downstream work station is shown in FIG. 6 wherein a series of air supply passages are formed in the top rail of the track for discharging a flow of air to move the shells and maintain them in contact with the underlying track halves defining a feed path for the shells.

In accordance with one feature of this invention, the burnishing station 14 is particularly suited to automatically position individual shells 20 face-up in sequence from the upstream track 18 for a burnishing operation which is performed on the outside rim and, if desired, on detailed areas of the stamped imagery 24 on the face of the shell 20.

Figure 2:
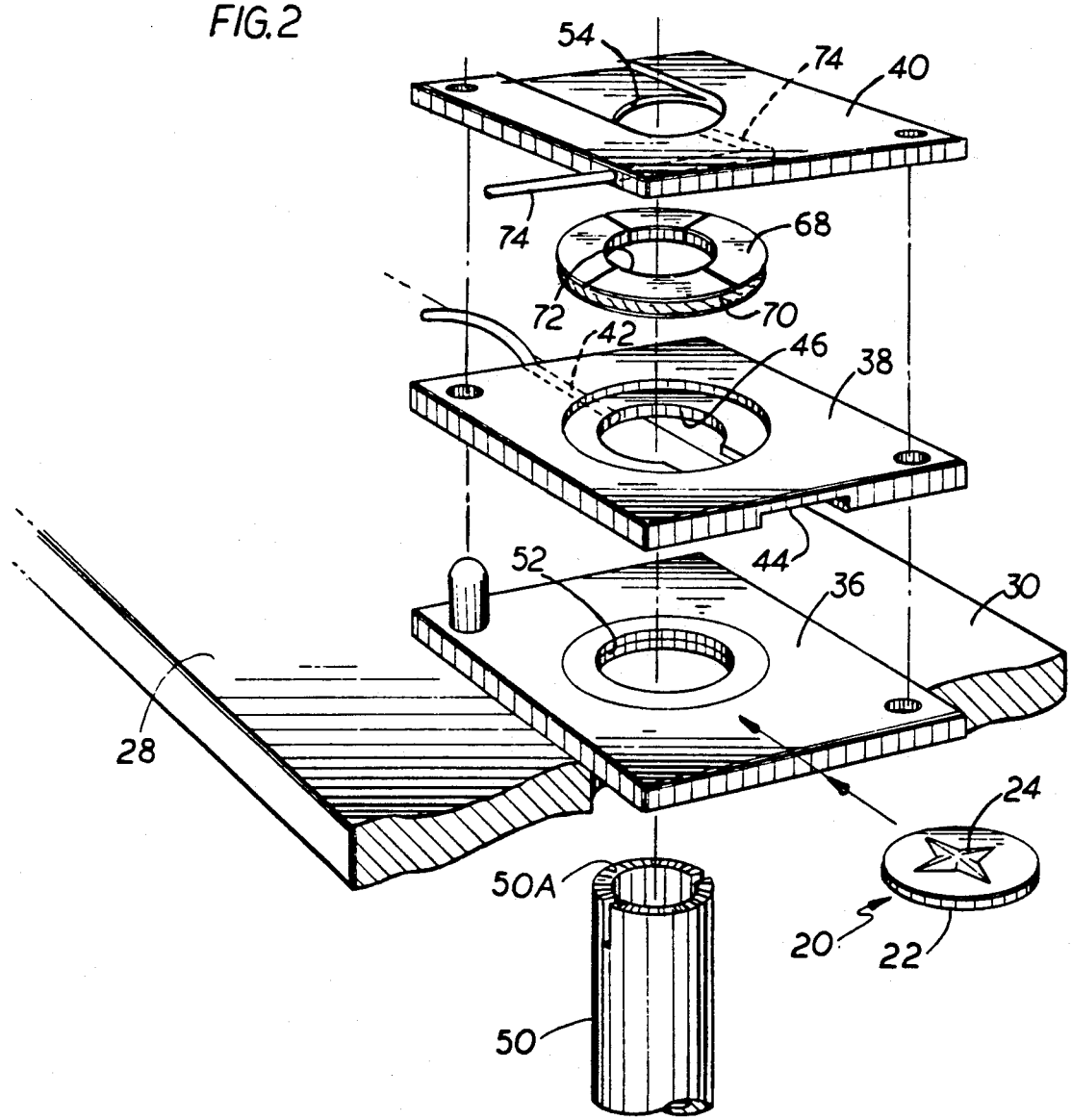
FIG. 2 is an exploded view, partly in section and partly broken away, showing parts of a burnishing station of the machine of FIG. 1.

More specifically, the illustrated burnishing station 14 includes a stack of three plates 36, 38 and 40 (FIG. 2). To determine the presence of a shell 20 at the burnishing station 14, a proximity sensor 42 of any suitable conventional type may be used to sense the presence of a shell at this station.

Figure 3:
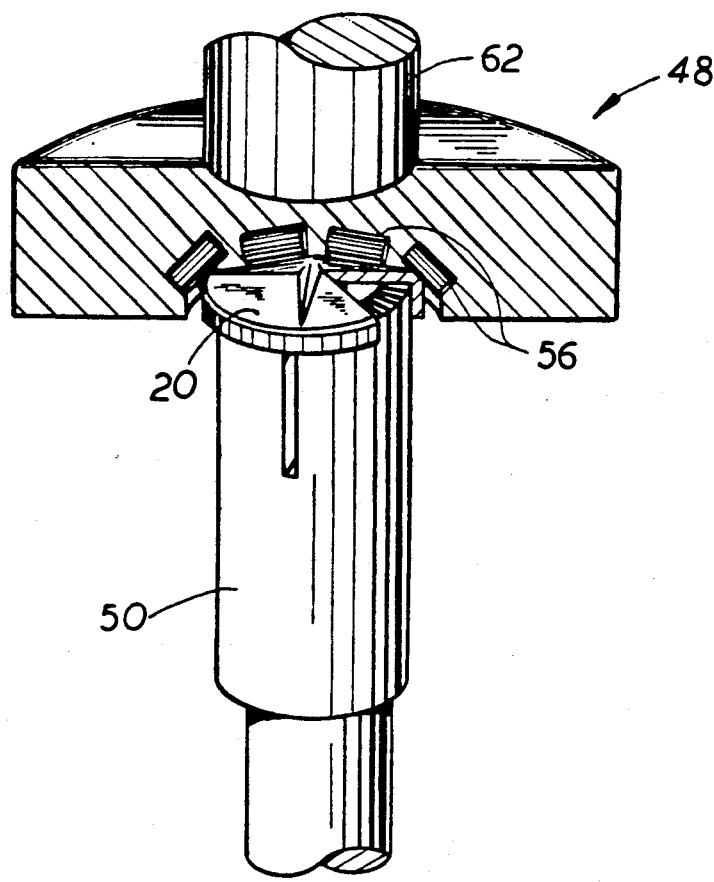
FIG. 3 is an isometric view, partly broken away and partly in section, showing a button shell on a mandrel under a burnishing head of the burnishing station.

In the specifically illustrated embodiment, a middle plate 38 is shown having such a sensor 42 facing a shell guideway 44 which will be understood to be in communication with the shell feed track 18. Upon a shell 20 being received within the opening 46 adjacent sensor 42, a signal from sensor causes a control circuit, not shown, to activate suitable power operations to rotate a burnishing head 48 and cycle a mandrel 50 (FIGS. 1 and 3) to reciprocate toward and away from that head 48. The middle plate 38 is sandwiched between upper and lower plates 36, 40 which have concentric openings 52, 54 through which burnishing mandrel 50 may be reciprocated from a ready position just underlying a shell received within opening 52 of plate 36 to an extended operative position. This last mentioned position is shown in FIG. 3 wherein mandrel 50 has lifted shell 20 through the openings 52, 46, 54 in burnishing plates 36, 38, 40 and into engagement with the overlying rotating burnishing head 48. To tightly and firmly maintain the shell 20 in desired position to be burnished properly when the burnishing head 48 itself begins spinning, mandrel 50 has its face 50A split into serrated segments for contact engagement with an inside face of the shell. The burnishing head 48 has interchangeable inserts with carbide segments such as at 56 for giving a high luster to the outer rim of the shell 20 and also detailed areas of its imagery as desired.

Mandrel 50 may be operated by any conventional means, such as a double-acting air cylinder 58 (FIG. 1) having reversible air connections for vertically reciprocating the mandrel 50 which is mounted for reciprocation on frame 10. (Suitable pneumatic controls, not shown, will be understood to be provided to selectively establish and reverse the air connections to the various cylinders hereinafter described responsive to signals received from elements of the control circuitry including proximity sensors specifically described below.) The overlying burnishing head 48 may be mounted within a bearing housing 60 and provided with lubricated bearings, not shown, for rotatably supporting a spindle 62 (FIG. 3) for the head with an upper fixed plate 64 supporting the bearing housing 60 with an air motor 66 on that plate 64 for rotating spindle 62.

Once the burnishing operation is complete, the air cylinder 58 retracts mandrel 50 into ready position below an annular stripper 68 illustrated in FIG. 2 as having an expansion spring 70 extending about the periphery of three stripper segments. An internal opening in the stripper 68 has a wall 72 tapered upwardly to permit a shell on the face of an upwardly moving mandrel 50 to readily pass through stripper 68 to be burnished. The stripper 68 then automatically stops any downward movement of the shell past the stripper upon retraction of the mandrel, thereby to remove the burnished shell from that mandrel 50 to be shot downstream along its track 18 leading to work station 16 under the influence of an air pulse directed through an internal air passage 74 formed within upper plate 40.

Before the work station 16 (hereinafter called the locating and closing station or L/C station) is normally activated for an automatic production run, the track 18 leading into that station is at least partially filled with burnished shells. An override switch, not shown, may be operated to allow only the burnishing station 14 to be operational until such time that track 18 is at least partially filled as desired with burnished shells. Once that is accomplished, the override switch is deactivated. The burnishing station 14 and the L/C station 16 are then operated in tandem in timed relation with one another responsive to signals from proximity sensors at the respective stations.

Figure 5:
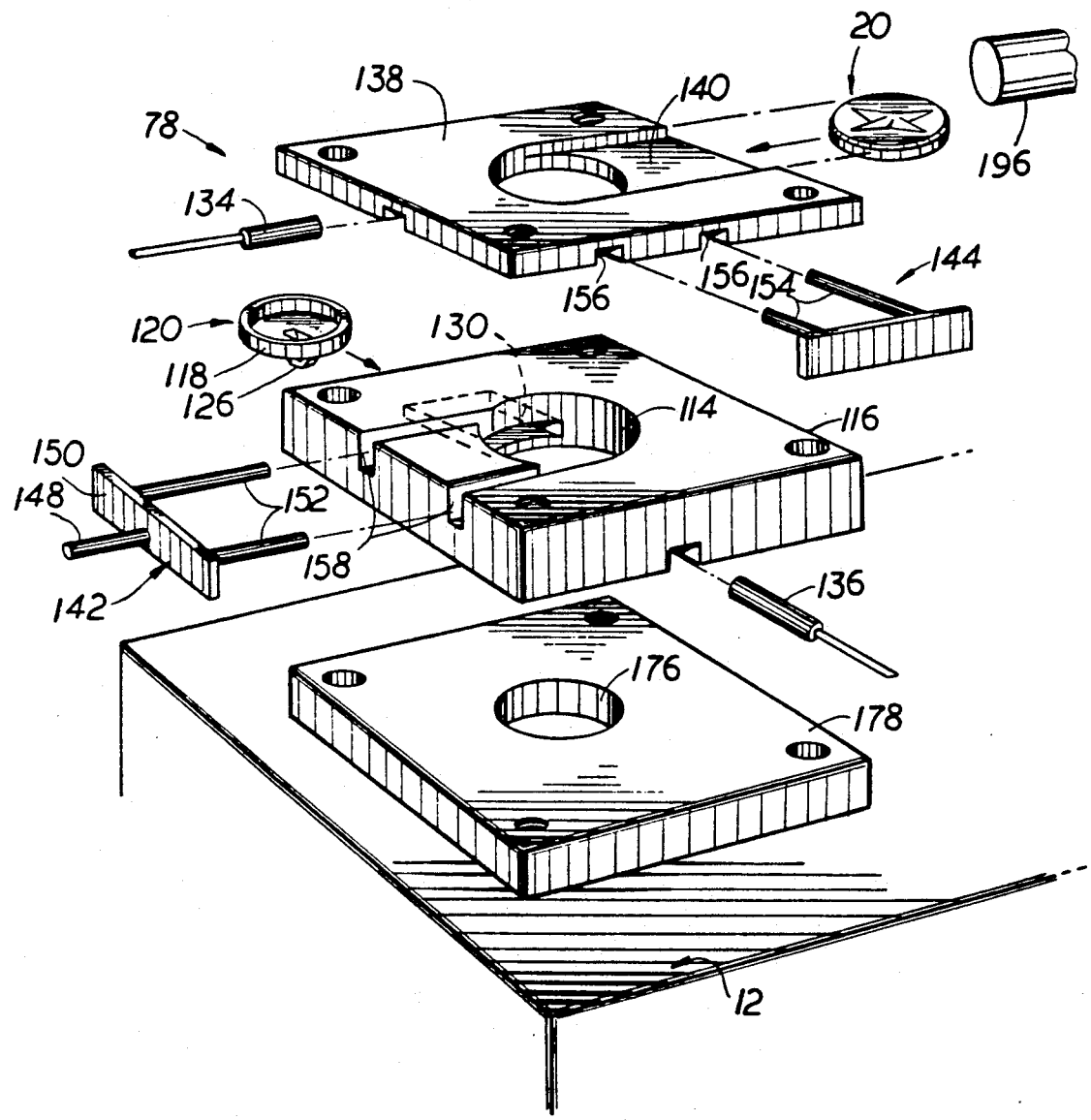
FIG. 5 is an exploded view, partly broken away and partly in section, showing parts of the locating and closing station.

In accordance with another feature of this invention, L/C station 16 includes a reciprocable mandrel 76 vertically movable through a series of concentric openings in a jig 78 which includes a three-plate stack (FIG. 5). Mandrel 76 moves toward and away from an overlying carriage 80 for a locating head 82. The carriage 80 is supported for vertical reciprocating movement on a pair of guide rods 84, 86 fixed to machine frame 12. The locating head 82 includes a double-acting air cylinder 88 fixed to the carriage and having a rod 90 for operating a rack 92 and pinion 94 driving connection to a rotary sleeve 96 supported for rotation on carriage 80 about a vertical axis.

Figure 7:
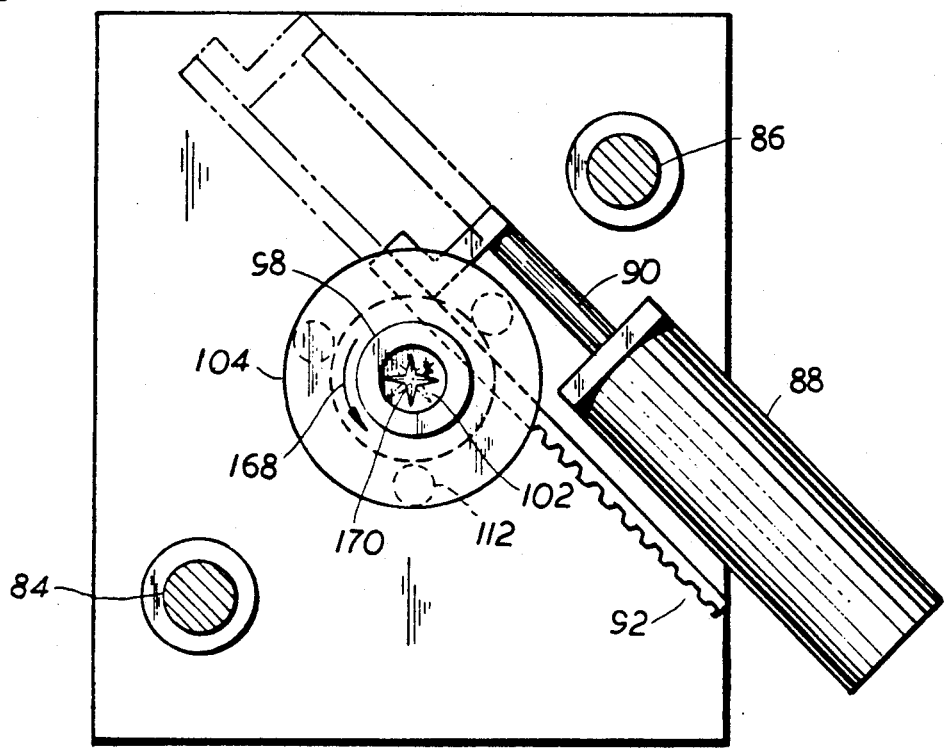
FIG. 7 is a plan view, partly in section, taken generally along line 7—7 of FIG. 9.

Sleeve 96 houses a punch 98, removably fixed by any suitable means such as screw 100 (FIG. 8), and a locating shell die 102 (FIG. 7) is mounted within punch 98. The punch and die are removable and interchangeable with other units for buttons of different sizes and imagery. To receive and guide a button for proper positioning, a collar 104 (FIG. 8) is mounted on an end of punch 98 with a groove 106 receiving a pin 108 fixed to punch 98 for limiting guide collar movement relative to the punch to a predetermined linear travel. An annular plate 110 is fixed to guide collar 104, and a plurality of springs are shown at 112 mounted between the sleeve 96 and plate 110 continuously urging guide collar 104 away from the free end of the sleeve.

To cooperate with the locating shell die 102, a complementary closing die is provided at 114 within the confines of middle plate 116 of the three-plate stack. As best seen in FIG. 5, that closing die 114 has a central opening tapered downwardly with a chamfer such that upon the closing of the dies 102, 114, sidewall 22 of shell 20 is crimped around an outer sidewall 118 of a button back 120, thereby to clamp the shell 20 and back 120 in assembly.

Figure 4:
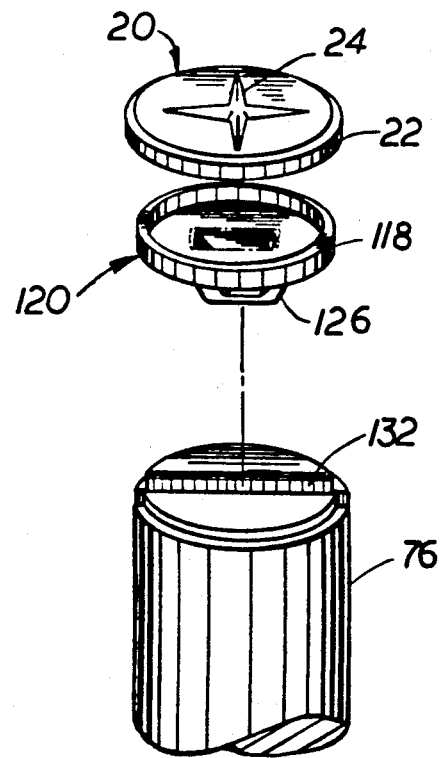
FIG. 4 is an isometric exploded view, partly broken away, showing button parts and a mandrel of a locating and closing station of the machine of FIG. 1.
Figure 8:
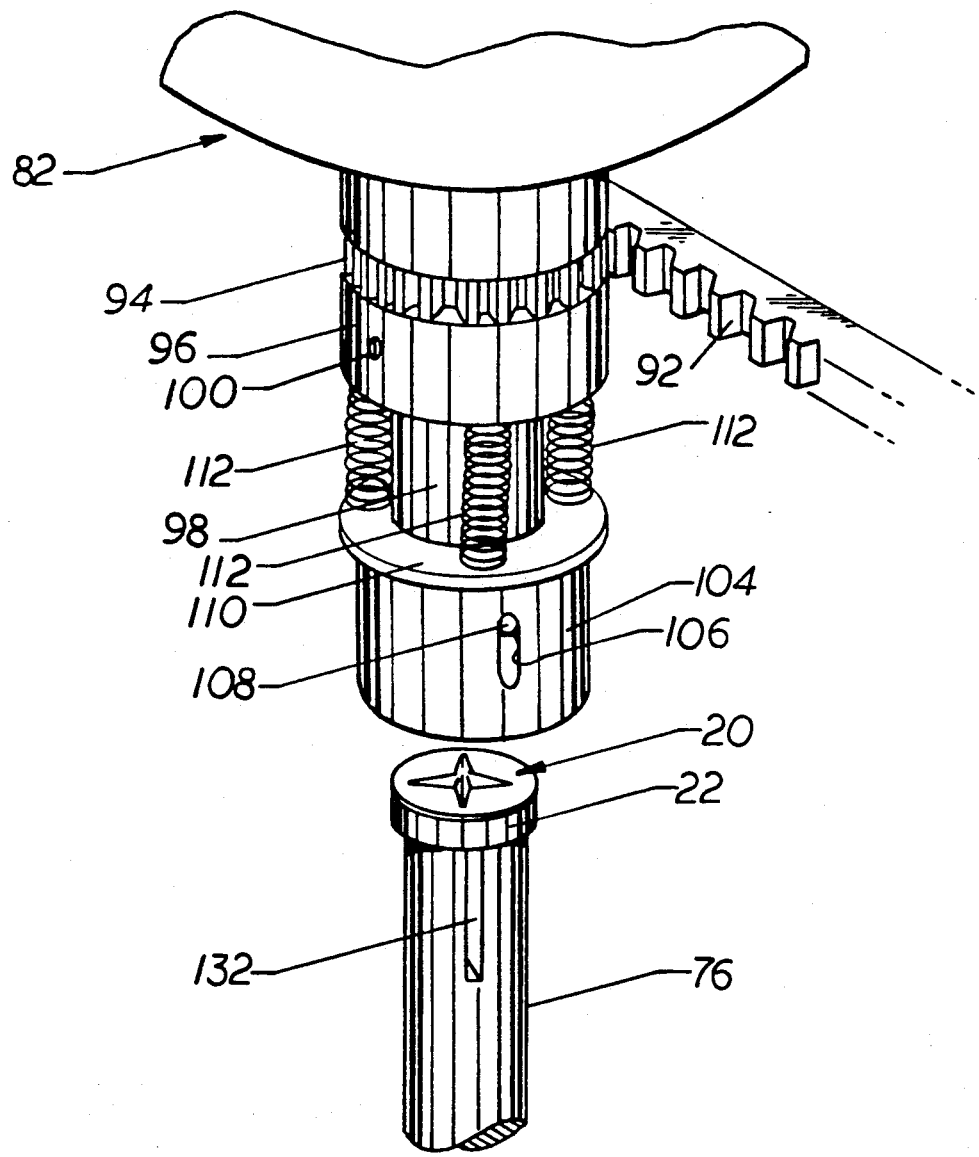
FIG. 8 is a partial isometric view of a locating head and underlying mandrel of the locating and closing station.

To provide a button back 120 for each shell 20, a second feed path, which may be identical in construction to the first feed path, is provided by a track 122 which leads from a second vibratory feeder 124 and is formed in perpendicular relation to the first described track 18. A projecting "hopper" 126 (FIGS. 4 and 5) on each button back 120 may be oriented with each hopper of each back aligned with its path of travel between feed rail halves (such as at 128 in FIG. 1) for discharge into a guideway 130 in middle plate 116 (FIG. 5) and an aligned slot 132 on an underlying working face of the mandrel 76 (FIGS. 4 and 8).

For quick and easy orientation of shell 20 and back 120 in the L/C station 16, a shell locating sensor 134 and a back locating sensor 136 are respectively provided in upper and middle plates 138 and 116 to signal correct positioning of the shell and back within the station. Each sensor 134, 136 faces the track 18, 122 from which the component part is being delivered. Specifically, the shell locating sensor 134 in upper plate 138 is directly aligned with the shell feed track 122 and guideway 140 formed in the upper plate 138 for delivery of the shells 20. The back locating sensor 136 is angularly displaced 90 degrees from the shell locating sensor 134 and is in the second or middle plate 116 directly facing the feed track 122 from which the back 120 is being delivered to the station 16 and the guideway 130 formed in middle plate 116 which will be understood to be communicating with the button back feed track 122.

To positively locate an individual shell 20 and complementary button back 120 in proper position within the L/C station 16 while yet preventing any following backs and shells from being moved undesirably into that same station, a pair of escapements 142, 144 (FIG. 5) are provided to be activated in unison by double-acting air cylinders, such as the one shown at 146 in FIG. 1 for the button back feed path having a piston rod 148 fixed to an end block 150 attached to escapement pins 152, 152 to move into and out of the feed path in timed relation to the machine cycling. More specifically, shell escapement pins 154, 154 are shown in FIG. 5 suitably mounted for reciprocating movement within slots 156, 156 formed in upper plate 138; button back escapement pins 152, 152 are suitably mounted for reciprocating movement within slots 158, 158 formed in middle plate.

Upon proper sensing of a shell and button back in correct positions at the L/C station, the shell locating sensor 134 and the back locating sensor 136 are activated whereupon a control circuit is conditioned to fire two air cylinders 160. 162 which have recriprocable piston rods 164. 166 drivingly connected to control the position of mandrel 76 to engage the back 120 and lift the back and the shell 20 within the L/C station into the locating head 82. Simultaneously with the firing of the two air cylinders 160, 162, the shell and back escapements 144. 142 are activated in unison to move into the feed paths to prevent any button parts from entering the L/C station as the back 120 within that station 16 is moved into engagement with its shell 20, and then the back and shell are moved in unison into guide collar 104 of locating head 82 to engage die 102. Thereupon, the control circuit activates the locating cylinder 88 which extends its piston rod 90 drivingly connected to rack 92, and the rack 92 and pinion 94 driving connection causes sleeve 96 carrying the closing punch 98 and locating die 102 to turn 360 degrees in a counterclockwise direction as shown by arrow 168 in FIG. 7. At some point on that angular path of movement, the button shell 20 "clicks" into the locating die 102 (which will be understood to have a face with indicia 170 which is a mirror image of imagery 24 precisely matching the face of the shell), thereby to assure registration of shell 20 with locating die 102 with that shell and its button back 120 in proper contact engagement with one another on the end of mandrel 76.

Figure 9:
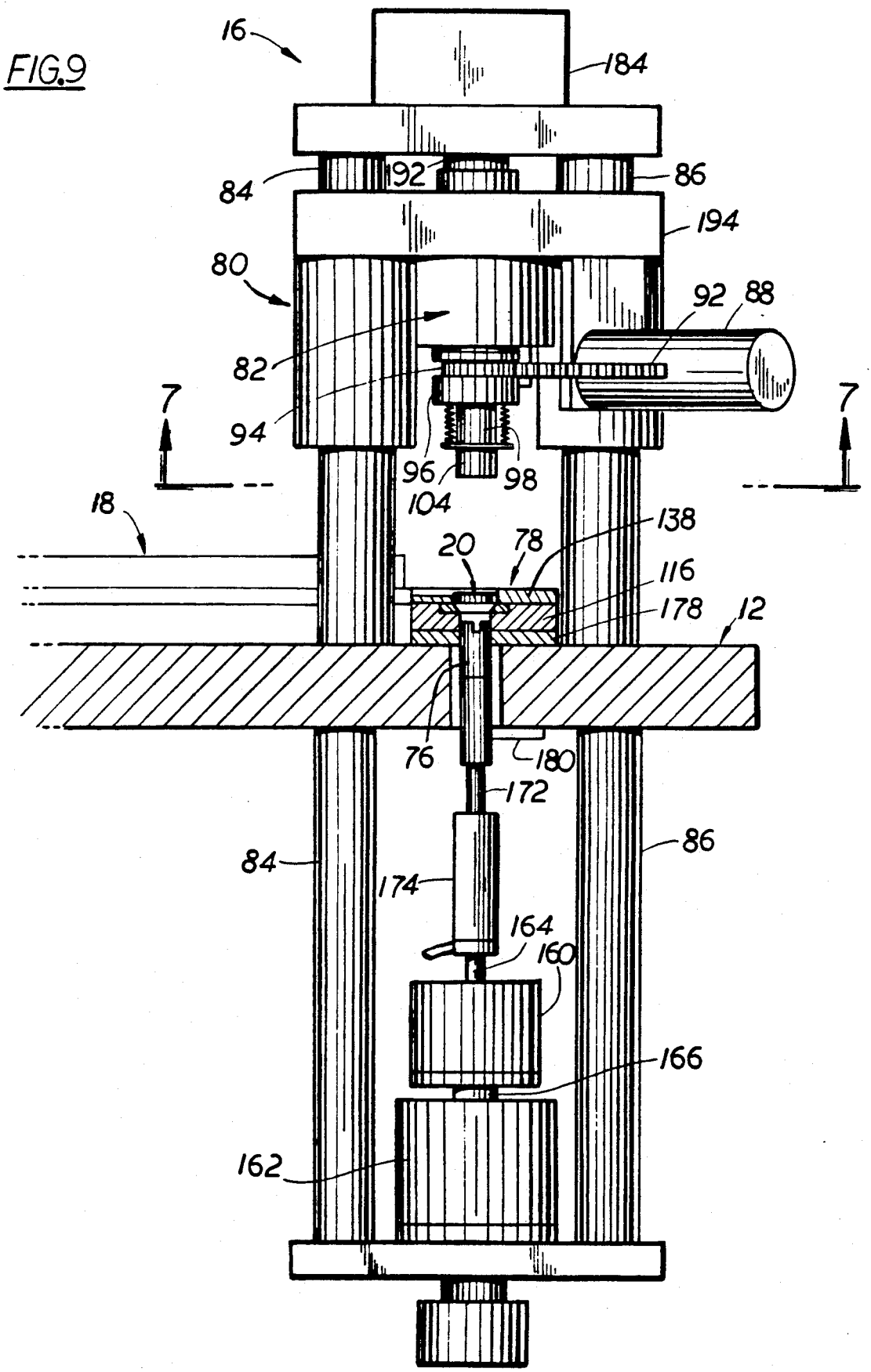
FIG. 9 is a side view, partly broken away and partly in section, showing the locating and closing station in a ready position.

In the specifically illustrated embodiment, mandrel 76 is shown mounted on an end of a piston rod 172 of an air spring 174 which will be understood to be under constant air bias in an extended direction. In FIG. 9 mandrel 76 is shown in its fully retracted ready position with its end disposed within opening 176 of lower plate 178 below closing die 114. The air spring 174 is mounted on reciprocable piston rod 164 of the coaxially aligned first air cylinder 160 which in turn is drivingly connected to reciprocable piston rod 166 of the larger coaxially aligned second air cylinder 162. These two air cylinders 160, 162 are each double acting to be selectively extended and retracted in a well-known manner.

Figure 10:
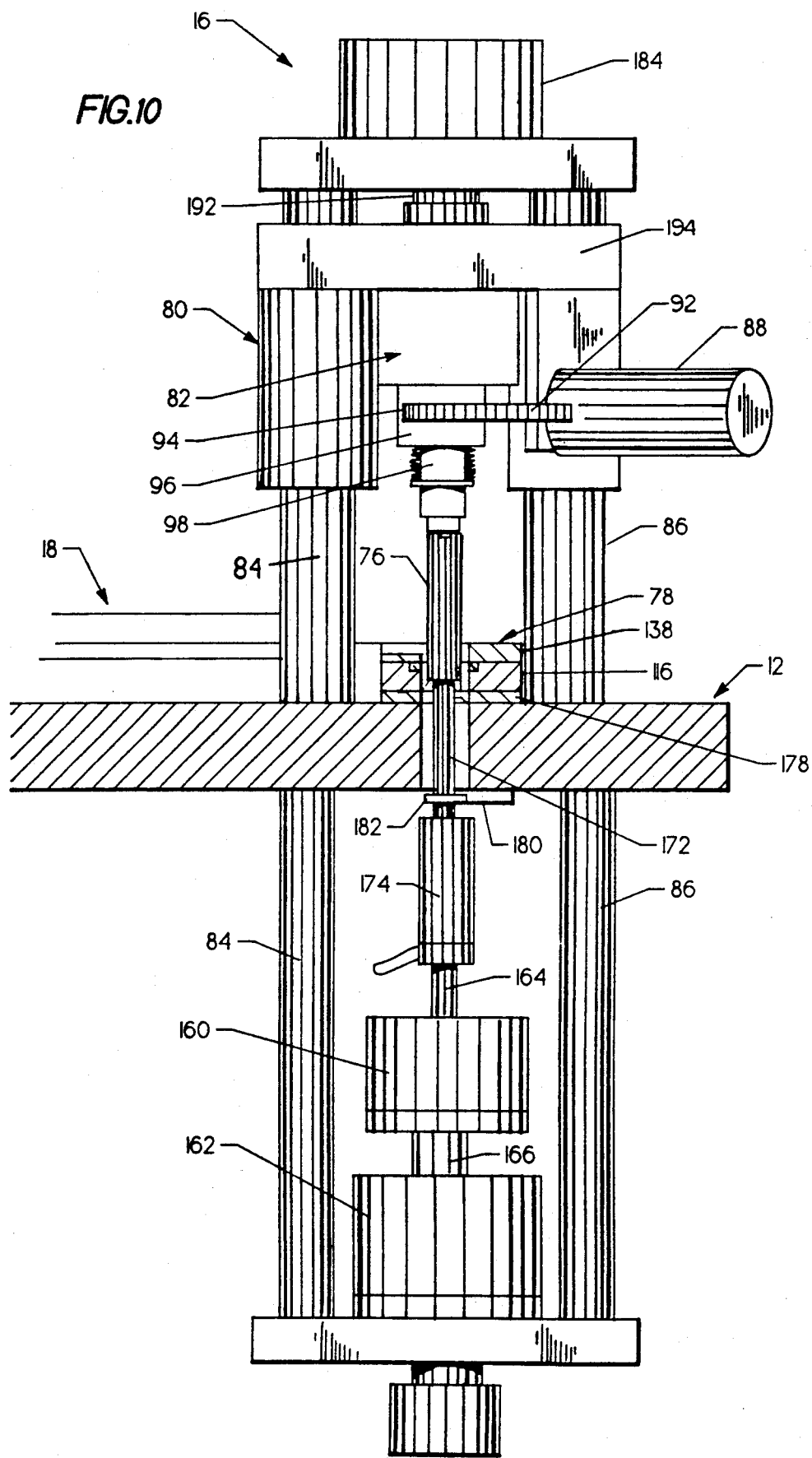
FIG. 10 is a view similar to FIG. 9 showing the locating and closing station in an intermediate position.

During the above described operation, the two air cylinders 160, 162 are simultaneously fired responsive to signals from sensors 134, 136 to fully extend piston rods 164, 166 to engage button back 120 and shell 20 in nesting relationship and to then lift the nested button back and shell in the L/C station 16 in unison into the overlying locating head 82. Shell 20 on mandrel 76 engages die 102 within the closing punch 98 (FIG. 7) with the rods 164, 166 of cylinders 160, 162 fully extended and positioning the mandrel 76 in an initial extended locating position with shell 20 engaged with shell locating die 102. The locating cylinder 88 then is activated to turn the locating die 360 degrees through the rack and pinion drive connection. During rotation of the locating die 102, air spring 174 continuously biases the mandrel 76 toward die 102. Registration of shell 20 within its die 102 normally should occur as signaled by a "click" of the shell into position within the locating die under the driving force of air spring 174. This final extension of mandrel 76 into its fully extended locating position coincides with proper locating and precise registration of the shell within its die. To sense this condition for a further closing step in the machine cycling, a mandrel locating sensor 180 is mounted under frame 12 to sense a washer 182 (FIG. 10) carried by air spring piston rod 172 which signals proper positioning of mandrel 76 in its fully extended locating position once that washer 182 comes into proximity with mandrel locating sensor 180. This sensor 180 then is activated to provide a signal to fire an upper closing air cylinder 184 to crimp the shell sidewall 22 onto the nested sidwall 118 of its back 120 and simultaneously activate a control 186 for a discharge chute 188 (FIG. 1) to position a directional flapper value 190 in that chute.

Figure 11:
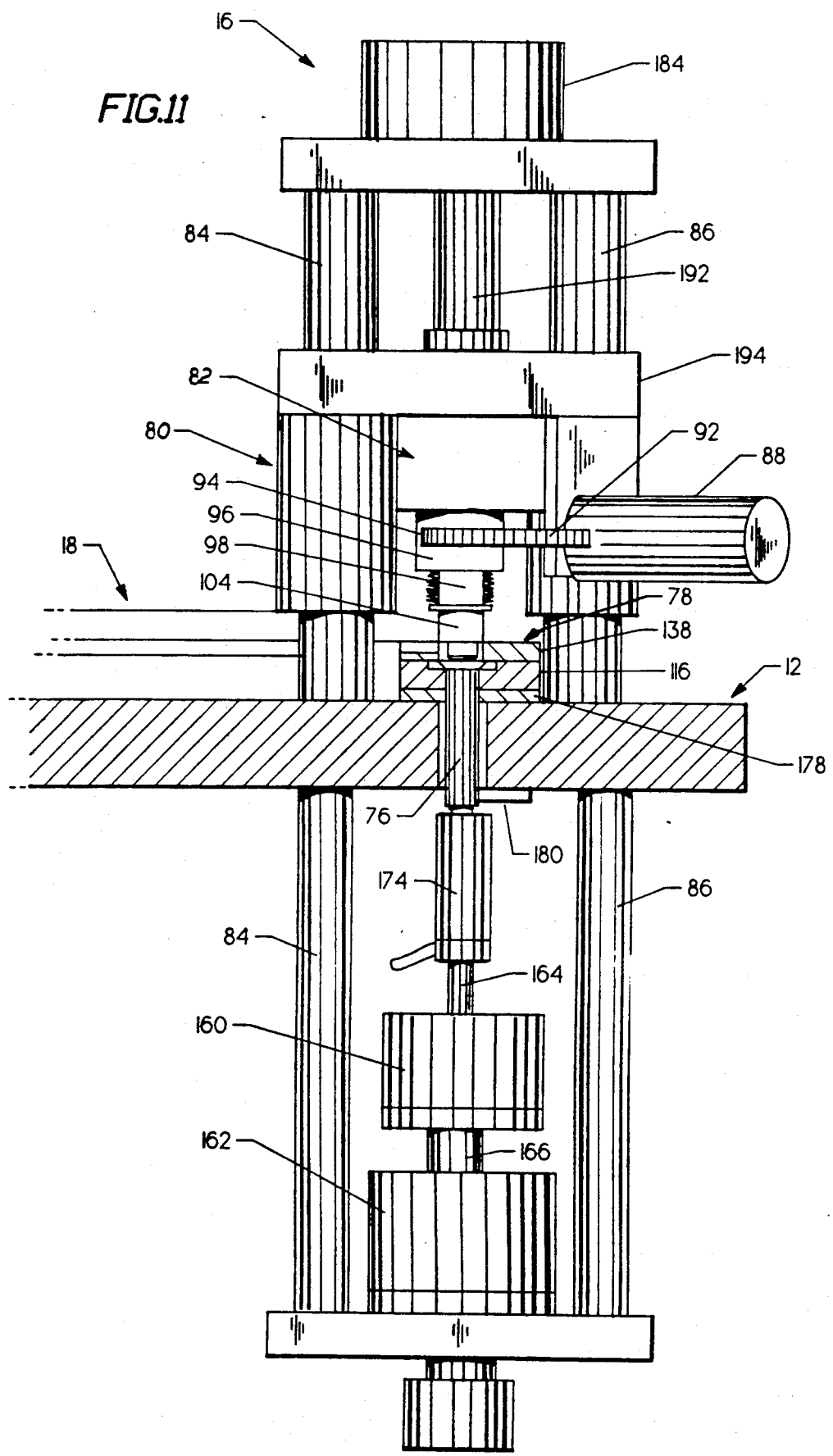
FIG. 11 is a view similar to FIGS. 9 and 10 showing the locating and closing station in a closing position.

In that closing cycle, the closing cylinder 184 is fired responsive to a signal from the mandrel locating sensor 180, whereupon piston rod 192 of cylinder 184 drives the die plate 194 and mandrel 76 downwardly to effect the closing of shell 20 onto the back 120 of the button upon driving punch 98 toward the closing die 114, thus crimping the button shell sidewall 22 onto the button back sidewall 118 within the closing die 114 of the middle plate 116 which is then positioned just over the back and under the shell within the L/C station. Die plate 194 and punch 198 travel is positively controlled by a suitable stop, not shown, which may be built into cylinder 184 to establish a closing position so that the components are not damaged by any undesired overtravel. Once rod 192 of closing cylinder 184 has bottomed out to its lower fully extended position (FIG. 11), a timing circuit causes it to be automatically retracted and returned into its upper ready position as illustrated in FIG. 9 and to automatically return the locating cylinder piston rod 90 into its ready position for the next operating cycle. The air spring 174 thereupon moves mandrel 76 upwardly a discrete distance as the closing cylinder 184 is retracted.

Upon the closing cylinder 184 being retracted into its upper ready position (FIG. 9) during upward movement of the mandrel, the air connections to the larger mandrel air cylinder 162 are also reversed to retract its piston rod 166 a preselected distance to position the finished button in alignment with a discharge port 196 (FIG. 5) disposed adjacent the end of the track 122 for the button backs. Mandrel 76 is then maintained in a partial withdrawn position with the now assembled button in its entirety being withdrawn from the locating die 102 in the overlying sleeve 96 and above the upper plate 138. At that point, discharge port 196 is pulsed and drives the finished button into discharge chute 188.

As described above, simultaneously with the mandrel locating sensor 180 being activated, the control circuit provides a signal to activate a control for the chute 188 which orients flapper valve 190 in a given direction such that a finished button will be directed out of the chute into a bin 198 for containing properly finished product. If the shell does not "click" into its die for some reason, the button back and shell components accordingly will not be sensed by mandrel sensor 180 to be in proper position in the L/C station 16. Thereupon, the sensor 180 and closing cylinder 184 will not be activated; the closing operation will be bypassed; and the flapper valve 190 will be automatically oriented in an opposite direction such that the individual back and shell pieces are then blown into the chute 188 and directed into a different bin 200 for rejected pieces. If upon inspection those pieces are found to be in good condition, they may be returned to their respective vibratory feeders.

Once the finished button or the rejected pieces have been blown into the chute, the second, smaller, mandrel air cylinder 160 is operated through a timing circuit to retract and thus move air spring 174 and mandrel 76 from its partial withdrawn position (FIG. 11) into its fully retracted ready position (FIG. 9) in condition for the next operating cycle of the machine. At that time the escapements 142, 144 are simultaneously withdrawn from their respective guideways 130, 140 upon return of mandrel 76 into its ready position, thereby permitting the next shell and next button back to be delivered into proper position within the L/C station 16.

From the above-described construction and operating steps of the machine, it will be understood that this invention provides a relatively simplified machine featuring efficient cycling at the locating and closing station which operates in high speed timed relation to the upstream burnishing station cycling. By virtue of the disclosed machine construction, it will be appreciated that the machine design is suited to provide accurate and reliable operaton over an extended period of time with minimum service requirements.

As will be apparent to persons skilled in the art, various modifications, adaptations and variations of the foregoing specific disclosure can be made without departing from the teachings of this invention.

I claim:

1. In a machine having a frame and work station mounted thereon for receiving a series of button shells and a succession of button backs to be assembled with the shells, an assembly apparatus comprising
   first and second feeders mounted on the frame for respectively advancing button shells and button backs along first and second feed paths in intermittent feeding movements to the work station,
   a locating jig positioning a shell and a button back in nested relation with one another in the work station, the locating jig including a closing die,
   a locating head having a shell locating die cooperating with the closing die of the jig, the locating head and jig being relatively movable toward and away from one another for closing the shell about the button back, and
   power means for effecting relative movement of the locating head and jig to close the shell about the button back during dwells between feeding movements of the button shells and button backs.

2. The apparatus of claim 1 wherein the locating head is mounted on the frame above the locating jig for reciprocating movement toward and away from the closing die, the jig and closing die being fixed on the frame, and wherein a mandrel is provided for moving a nested shell and button back between the jig and the shell locating die.

3. The apparatus of claim 2 wherein the shell locating die is reciprocable between a retracted ready position and an extended operative position, wherein the mandrel is supported for reciprocation along an axis of movement in coaxial alignment with the axis of reciprocation of the locating head, and wherein the mandrel is reciprocable between a fully retracted ready position, for receiving the nested shell and button back, and an initial extended position wherein the shell carried by the mandrel is engaging the shell locating die in its retracted ready position.

4. The apparatus of claim 3 wherein the shell locating die is rotatable in its retracted ready position when the mandrel is in its initial extended position for registering the shell on the mandrel within the complementary shell locating die.

5. The apparatus of claim 4 including powered drive means for driving shell locating die and the mandrel carrying the nested shell and button back from the retracted ready position of the shell locating die to its extended operative position to crimp the shell about the botton back in the closing die of the locating jig.

6. The apparatus of claim 2 wherein the locating head includes a rotary sleeve, the shell locating die being fixed to the rotary sleeve, and wherein the mandrel is movable from a retracted ready position to an extended position for positioning the nested shell and button back with the shell engaging the shell locating die.

7. The apparatus of claim 1 wherein the button shells have imagery formed thereon, wherein the shell locating die has indicia formed thereon which precisely matches the imagery formed on the button shells, and wherein powered drive means are provided for rotating the shell locating die for precision registration of a button shell within the shell locating die.

8. The apparatus of claim 7 further including a mandrel mounted on the frame for moving a nested shell and button back between the jig and the shell locating die, and biasing means for continuously urging the mandrel and the nested shell and back carried thereby toward the shell locating die for engaging the shell with the shell locating die, the powered drive means being operative after initial engagement of the shell and the shell locating die.

9. The apparatus of claim 6 wherein the power means serves to drive the locating head and the shell and button back nested on the mandrel in unison toward the locating jig with the shell in registration with the shell locating die to effect closure of the shell on its back upon bottoming of the button back in the closing die of the locating jig.

10. The apparatus of claim 7 wherein the closing die of the jig and the shell locating die of the head are each removably mounted in the locating jig and head respectively for quick and easy replacement to accommodate button shells and button backs of different shell imagery and different sizes.

11. The apparatus of claim 1 wherein the first and second feeders each include a vibratory feeder respectively feeding button shells and button backs to first and second feed rails extending between the feeders and the work station.

12. The apparatus of claim 11 wherein each of the feed rails is adjustable for accommodating button shells and button backs of different sizes.

13. The apparatus of claim 1 wherein the locating jig comprises a plurality of plates having aligned openings, and wherein a mandrel is mounted on the frame for reciprocation between a retracted ready position in underlying relation to the closing die of the locating jig and an extended position adjacent the shell locating die, the shell locating die being in overlying relation to the mandrel for receiving a shell carried by the mandrel to locate the same in proper position before closing the shell about the button back.

14. The apparatus of claim 13 wherein the mandrel is drivingly connected to a biasing means for urging the button shell carried by the mandrel into registration with the shell locating die.

15. The apparatus of claim 1 wherein the button back includes a projection extending away from the shell when the shell and button back are in nested relation, and wherein the mandrel has a face thereon with a recess matching the button back projection for receiving and orienting the button back in the locating jig.

16. The apparatus of claim 1 wherein the locating jig includes first and second plates in stacked relation, a mandrel mounted on the frame for reciprocation toward and away from the locating head, the plates having openings therein in coaxial alignment with the axis of reciprocation of the mandrel, the first plate being formed with a guideway for receiving a button shell within the opening of the first plate in overlying relation to the opening of the underlying second plate, wherein the underlying second plate has a guideway therein for receiving a button in the opening of the second plate in underlying nested relation to the button shell, and wherein the opening of the underlying second plate is tapered and forms said closing die of the locating jig.

17. The apparatus of claim 16 wherein the first and second plates each have reciprocable escapements for intermittently arresting advancing movements of the shells and button backs in their respective feed paths in timed relation to locating and closing operations of the apparatus for given shell and its corresponding button back on the work station.

18. The apparatus of claim 17 further including proximity sensors in the first and second plates for sensing the presence of a shell and button back therein in proper nested relation for signaling a subsequent cycling operation.

19. The apparatus of claim 18 further including mandrel driving means responsive to the proximity sensors for driving the mandrel and the nested shell and button back carried thereby from the locating jig toward the locating head for locating the shell in engagement with the shell locating die when the mandrel is located in an initial extended position.

20. The apparatus of claim 19 wherein biasing means are provided for continuously urging the mandrel toward the locating head, wherein the shell includes imagery on its face, wherein the locating die includes indicia thereon precisely matching the shell imagery, and wherein the mandrel is urged by its biasing means to move from its initial extended position into a fully extended locating position to precisely register the shell imagery within the indicia of the shell locating die.

21. The apparatus of claim 20 wherein the locating head further includes rotary drive means for rotating the shell locating die when the mandrel is in its initial extended position, the rotary drive means and the biasing means cooperating to effect registration of shell imagery within the indicia of the shell locating die.

22. The apparatus of claim 21 further including a sensor for detecting movement of the mandrel from its initial extended position into its fully extended locating position, said power means being responsive to a signal from the sensor for driving the locating head toward the locating jig to effect closing of the shell about its button back within the closing die.

23. The apparatus of claim 1 further including a burnishing station mounted on the frame in the first feed path upstream of the work station, the burnishing station including a rotary burnishing head mounted above the first feed path, a burnishing mandrel supported on the frame for reciprocating movement toward and away from the burnishing head along an axis of movement coincident with the rotation axis of the burnishing head, the burnishing mandrel being reciprocable between a retracted position in underlying relation to the first feed path and an extended position above the first feed path in underlying relation to the rotary burnishing head for positioning a button shell therein for a burnishing operation.

24. The apparatus of claim 23 further including upper and lower plates supported in stacked relation on the frame at the burnishing station, the plates each having concentric openings therein for receiving a button shell being advanced along the first feed path, the openings of the plates being in coaxial alignment with the axis of reciprocation of the mandrel and the rotational axis of the burnishing head.

25. The apparatus of claim 24 further including a resilient stripper member between the stacked plates and having an opening in coaxial relation to the openings of the plates, the stripper member permitting one way movement of a shell therethrough carried on the face of the mandrel and through the opening of the overlying plate into contact with the overlying rotary burnishing head, the resilient stripper member permitting return mandrel movement from its extended to retracted positions but arresting any following movement of the burnished button shell, thereby to permit continued advancing feeding movement of each burnished shell to the downstream work station.

26. The apparatus of claim 25 further including proximity sensor for sensing the presence of a shell in the burnishing station to signal a subsequent machine operation wherein the mandrel is driven from its retracted to extended positions to effect shell burnishing.

27. The apparatus of claim 26 further including an air passage communicating with the opening in one of the plates to provide an air pulse for driving a burnished shell, stripped from the mandrel, downstream of the burnishing station into the first feed path leading to the downstream work station.

28. A method of assembling buttons comprising the steps of nesting a button shell and complementary button back, engaging the shell of the nested shell and button back with a shell locating die, rotating the shell locating die relative to the button shell to effect precision registration of imagery and indicia carried on confronting faces of the shell and shell locating die, and then closing the shell about the button back by compressing the button parts between the shell locating die and a closing die to close the shell onto the button back to secure the same in assembled relation.

29. The method of claim 28 including a further step of feeding series of button shells and a succession of button backs along first and second feed paths to a locating and closing station for positioning each shell and button back in condition for the nesting step.

30. The method of claim 29 including the further steps of feeding the button shells along the first feed path into a burnishing station upstream of the locating and closing station, burnishing the button shells and then delivering the burnished shells to the downstream locating and closing station before the nesting step.

31. The method of claim 28 including the further step of orienting each button back in a preselected position with a projection on the button back being received in a recess on a mandrel in condition for the nesting step.

32. The method of claim 31 including the further step of reciprocating the mandrel with the button back carried thereby in nested relation with the button shell to effect the engaging step.

33. The method of claim 30 wherein the burnishing step includes moving a button shell by means of a reciprocable mandrel toward and away from a burnishing head along a path of movement perpendicular to the first feed path of the botton shell before the nesting step.

34. The method of claim 33 further including the step of stripping a burnished shell from the face of the mandrel upon retraction of the mandrel along its path of movement for continued feeding of the burnished shell along its first feed path to the shell locating die.

35. The method of claim 28 wherein the engaging step is effected by moving the nested shell and button back into engagement with the shell locating die.

* * * * *